(12) United States Patent
Achyutuni

(10) Patent No.: US 10,013,499 B2
(45) Date of Patent: Jul. 3, 2018

(54) CORRECTING RESOURCE DESCRIPTIVE FRAMEWORK STATEMENTS BASED ON SIMILARITY OF TERMS TO WEB ONTOLOGY

(71) Applicant: CA, INC., New York, NY (US)

(72) Inventor: Kiran Jyotsna Achyutuni, Bangalore (IN)

(73) Assignee: CA, INC., New York, NY (US)

( * ) Notice: Subject to any disclaimer, the term of this patent is extended or adjusted under 35 U.S.C. 154(b) by 942 days.

(21) Appl. No.: 14/492,472

(22) Filed: Sep. 22, 2014

(65) Prior Publication Data

US 2016/0085877 A1    Mar. 24, 2016

(51) Int. Cl.
    *G06F 17/30*     (2006.01)
    *G06F 7/00*     (2006.01)
    *G06F 17/24*     (2006.01)

(52) U.S. Cl.
CPC .. *G06F 17/30896* (2013.01); *G06F 17/30442* (2013.01); *G06F 17/30595* (2013.01); *G06F 17/30932* (2013.01)

(58) Field of Classification Search
CPC ......... G06F 17/30896; G06F 17/30442; G06F 17/30595; G06F 17/30932
USPC ......................................... 707/713; 715/234
See application file for complete search history.

(56) References Cited

U.S. PATENT DOCUMENTS

| | | | |
|---|---|---|---|
| 8,631,048 B1* | 1/2014 | Davis | G06F 17/30292 707/803 |
| 2010/0070448 A1* | 3/2010 | Omoigui | H01L 27/1463 706/47 |
| 2011/0004863 A1* | 1/2011 | Feblowitz | G08G 1/04 717/105 |
| 2012/0150922 A1* | 6/2012 | Yalamanchi | G06F 17/30507 707/812 |
| 2014/0013205 A1* | 1/2014 | Mikhaiel | G06F 17/2247 715/234 |
| 2014/0019385 A1* | 1/2014 | Dawson | G06F 17/2705 706/10 |

* cited by examiner

*Primary Examiner* — Kuen S Lu
(74) *Attorney, Agent, or Firm* — Sage Patent Group

(57) ABSTRACT

A list of unique terms, each having prefix and associated property data, contained in a defined web ontology is generated. A RDF statement about a web resource is received, and a list of unique terms contained in the RDF statement is generated. A problem term is identified within the list of unique terms contained in the RDF statement that is not present among the list of unique terms contained in the web ontology. A list of candidate terms that are contained in the web ontology that satisfy a threshold similarity to the problem term is generated. A candidate term is selected from among the list of candidate terms having a data type for the property data matching a data type for the property data of the problem term. The candidate term is substituted for each occurrence of the problem term contained in the RDF statement.

20 Claims, 5 Drawing Sheets

CORRECTING RESOURCE DESCRIPTIVE FRAMEWORK STATEMENTS BASED ON SIMILARITY OF TERMS TO WEB ONTOLOGY

BACKGROUND

The present disclosure relates to computers that process web pages, web documents, and other web resources.

Many web sites are generated from information containing descriptive resource data and structure data. When this information is formatted into HTML, it becomes difficult for a search engine to recover the structure data. Search engines and other web applications can benefit from direct access to the structure data. On-page markup enables search engines to understand the structure data of a web resource and provide richer search results in order to make it easier for users to find relevant information on the web. Markup can also enable new tools and applications that make use of the structure data.

Resource Description Framework (RDF) provides industry standard conventions about syntax, structure, and semantics that are used for interoperable communication of RDF statements through the web across different applications. A RDF web ontology in the semantic web can define a large number of terms of RDF statements, with the terms including prefixes and properties. When a RDF statement is composed in a serialized format, such as Java Script Object Notation-Linked Data (JSON-LD), a web author can select among terms from different web ontologies. In view of the rapidly increasing number of web ontologies it is becoming more complex for web applications to decode RDF statements and increases the likelihood that some terms in RDF statements will be mischaracterized or unrecognizable.

SUMMARY

Some embodiments disclosed herein are directed to a method by a computer that includes generating a list of unique terms contained in a defined web ontology language. Each term includes comprising prefix data and associated property data. A resource descriptive framework (RDF) statement about a web resource is received. A list of unique terms, each including prefix data and associated property data, contained in the RDF statement is generated. A problem term is identified within the list of unique terms contained in the RDF statement that is not present among the list of unique terms contained in the defined web ontology language. A list of candidate terms that are contained in the defined web ontology that satisfy a threshold similarity to the problem term is generated. A candidate term is selected from among the list of candidate terms having a data type for the property data that matches a data type for the property data of the problem term. The candidate term is substituted for each occurrence of the problem term contained in the RDF statement.

Some other embodiments are directed to a computer program product that includes a computer readable storage medium having computer readable program code embodied in the medium. The computer readable program code when executed by a processor of a computer system causes the computer system to perform operations that include generating a list of unique terms, each comprising prefix data and associated property data, contained in a defined web ontology language. Each term includes prefix data and associated property data. The operations further include receiving a RDF statement about a web resource, generating a list of unique terms, each comprising prefix data and associated property data, contained in the RDF statement, and identifying a problem term within the list of unique terms contained in the RDF statement that is not present among the list of unique terms contained in the defined web ontology language. The operations further include generating a list of candidate terms contained in the defined web ontology that satisfy a threshold similarity to the problem term, selecting a candidate term from among the list of candidate terms having a data type for the property data that matches a data type for the property data of the problem term, and substituting the candidate term for each occurrence of the problem term contained in the RDF statement.

BRIEF DESCRIPTION OF THE DRAWINGS

Aspects of the present disclosure are illustrated by way of example and are not limited by the accompanying drawings. In the drawings.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Figure 1:
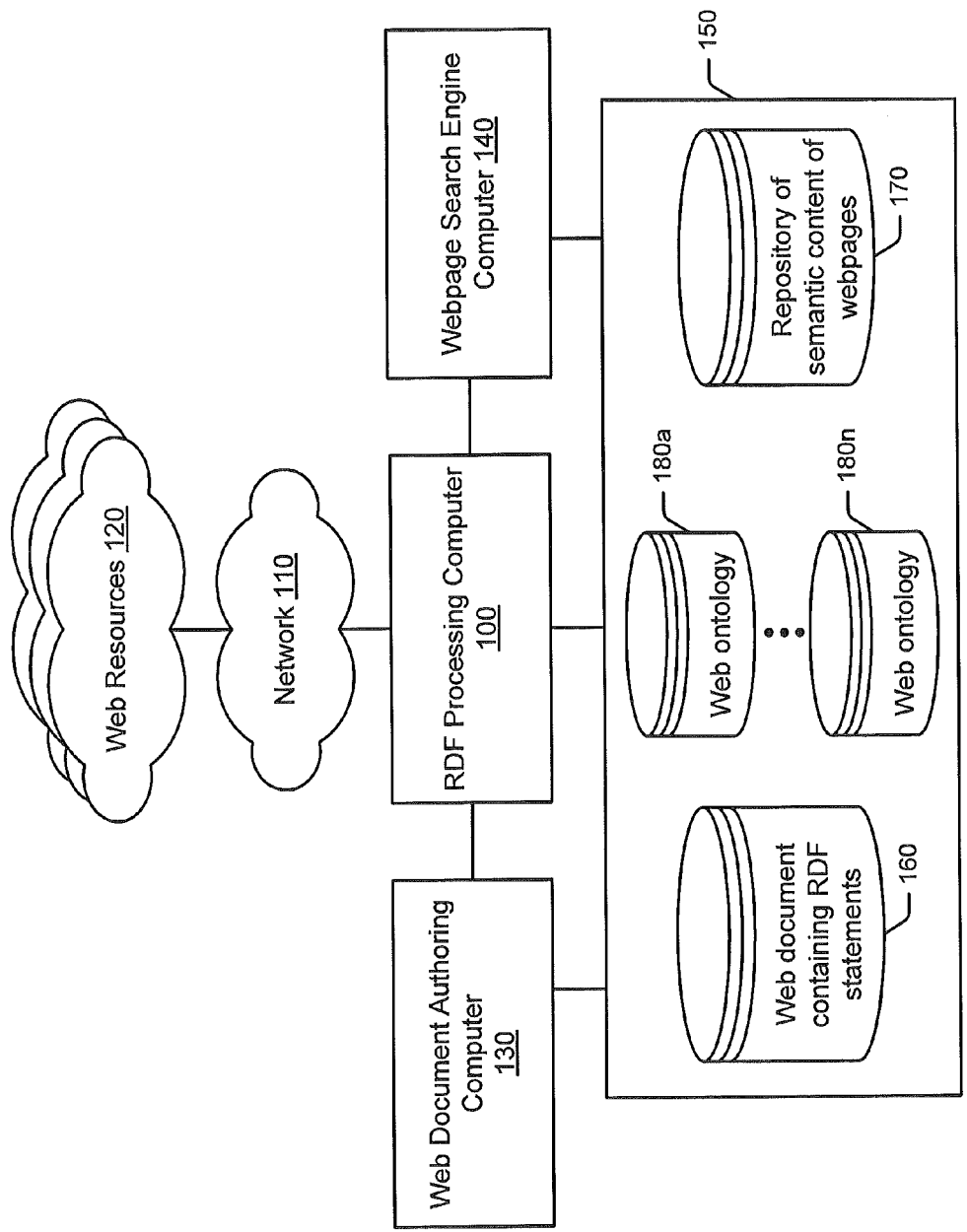
FIG. 1 is a block diagram of a system containing a RDF processing computer that interfaces with a repository of web documents and/or a repository of semantic content of web pages to process RDF statements characterizing web resources according to some embodiments.

Some embodiments of the present disclosure are described in the context of FIG. 1 which illustrates a block diagram of a system containing a RDF processing computer 100 that interfaces with a repository of web documents 160 and/or a repository of semantic content of web pages 170 to process RDF statements according to some embodiments.

The terms first, second, etc. are used herein to distinguish one RDF statement term from another RDF statement term. References to first, second, etc. do not constrain the terms to occurring in any particular sequence or location within a RDF statement or list.

Web documents in the repository 160 can be authored by a user (author) operating the web document authoring computer 130 to describe web resources 120 using RDF statements having terms defined by web ontologies 180a-180n (where "n" is any positive integer). The repositories 160, 170, and 180a-180n are collectively referenced as 150. The web ontologies 180a-180n are each a collection of terms that form a common vocabulary denoting the types, properties and interrelationships of concepts in a domain. The web ontologies can each be defined by a Web Ontology Language (OWL). OWL is a family of knowledge representation languages or ontology languages for authoring ontologies or knowledge bases. The languages are characterized by formal semantics and RDF/XML-based serializations for the Semantic Web. OWL is endorsed by the World Wide Web Consortium (W3C). Example web document authoring tools include, but are not limited to, Web Ontology Manager by IBM, and Protégé.

A web page search engine computer 140, which may also be called a web crawler, systematically browses the web to index content of web sites, such as the web resources 120, via a data network 110. The data network 110 can include one or more private networks and/or public networks (e.g., Internet). The content is indexed using RDF statements, having terms defined by web ontologies, which are stored in the repository of semantic content of web pages 150.

The web ontologies 180a-180n form a semantic web that can define a large number of terms including prefixes and properties e.g., "prefix:property_name", which can form RDF statements. When a RDF statement is composed in a serialized format, such as JSON-LD, the web document authoring computer 130 and/or web page search engine computer 140 can select among terms from the different web ontologies 180a-180n.

Absent use of at least one of the embodiments disclosed herein, the process of encoding (selecting) and decoding the terms in a RDF statement can be error prone. When the prefixes are missing, undefined prefixes are used, or errors occur in prefixes, the terms can be dropped by RDF parsers (such as a JSON-LD parser), which may operate in the web document authoring computer 130 and/or web page search engine computer 140, and the information can be lost. When the properties (e.g., property_names) are missing, undefined properties are used, or errors occur in properties, miscategorized information can result in a RDF graph generated from RDF statements.

Illustration of these problems is provided by the following two example RDF statement errors in a JSON-LD message. In the example, an entity called "machine" has two attributes: name, ipaddress. These attributes are defined in a web ontology that has a prefix "datacenter".

A corresponding valid JSON-LD message follows:

```
{
    @context: {
        "datacenter": "http://example.com/datacenter/v1.0/"
    }
    "datacenter:machine" : {
        "datacenter:name": "somename",
        "datacenter:ipaddress" : "1.2.3.4"
    }
}
```

When the JSON-LD message is generated it can contain a misspelled prefix and/or an error may be introduced into the prefix while stored on in a data storage device of a web server and/or while being communicated to a web search engine or other web tool through numerous network media and routing servers.

Error 1: Misspelled Prefix.

The following JSON-LD message contains an error in the prefix "datacenter" which is erroneously indicated as "data_center", as illustrated below:

```
{
    @context: {
        "datacenter": "http://example.com/datacenter/v1.0/"
    }
    "datacenter:machine" : {
        "datacenter:name": "somename",
        "data_center:ipaddress" : "1.2.3.4"
    }
}
```

In this case, the attribute "ipaddress" may be unrecognized and the information may be discarded by a RDF parser, absent use of at least one embodiment disclosed herein.

Error 2: Incorrect Property Names

The following JSON-LD message contains an error in the property "name"" which is erroneously indicated as "naame", as illustrated below:

```
{
    @context: {
        "datacenter": "http://example.com/datacenter/v1.0/"
    }
    "datacenter:machine" : {
        "datacenter:naame": "somename",
        "datacenter:ipaddress" : "1.2.3.4"
    }
}
```

In this case, absent use of at least one embodiment disclosed herein, the error in the property name "name" causes the property "naame" to be viewed as a new property, but for various operations disclosed herein. The erroneous consequence of treating the property "naame" as a new property is that in the RDF graph, information may be miscategorized as "naame" instead of "name". This may have further consequences during search and analytics by, for example, the web page search engine 140. During a web search, the "naame" node may not be retrieved from the RDF graph resulting in lost information. During analytics, the "naame" node may not be considered resulting in incorrect analytics.

Some embodiments of the present disclosure are directed to identifying and correcting errors in RDF statements. In one embodiment, problematic terms in RDF statements that need correction are identified. The problematic terms can be identified based on them missing prefixes, based on them containing valid prefixes but invalid property names, based on them containing valid prefixes but property names not in the specified ontology, and/or based on them containing invalid prefixes.

In a further embodiment, candidate terms for each problematic term are identified using similarity and/or type matching techniques. The term and its value can be used together to identify the candidate terms.

Figure 2:
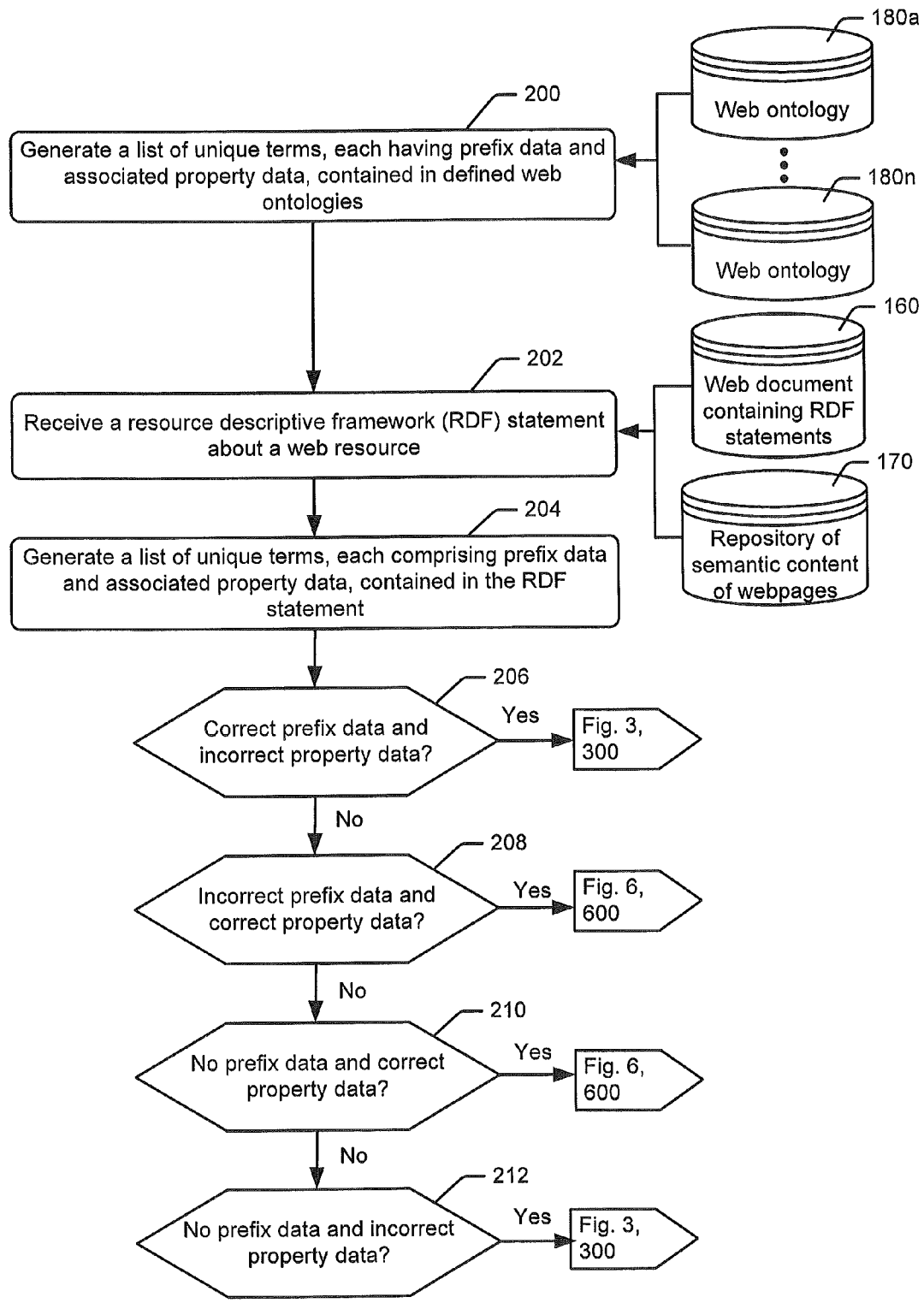
FIGS. 2-6 are flowcharts of various operations and methods by a RDF processing computer for processing RDF statements in accordance with some embodiments.

FIGS. 2-6 are flowcharts of various operations and methods by a RDF processing computer for processing RDF statements to identify and replace problematic terms in accordance with some embodiment. Referring to FIG. 2, a list of unique terms contained in a plurality of web ontologies 180a-180n is generated (Block 200). Each unique term includes prefix data and associated property data. The list of unique terms contained in a plurality of web ontologies 180a-180n can be referred to as "set A".

An RDF statement about a web resource 120 is received (Block 202). The statement may be received from the web document authoring computer 130, read from the repository of web documents containing RDF statements 160, received from the web page search engine computer 140, and/or read from a repository semantic content of web pages 170. A list of unique terms contained in the RDF statement is generated (Block 204). Each of the unique terms includes prefix data and associated property data. The list of unique terms contained in the RDF statement can be referred to as "set B".

The RDF processing computer 100 compares the sets A and B to identify problematic terms. More particularly, each of the terms in the RDF statement processed to identify whether the prefix data and/or the property data of the term does not match corresponding prefix data and/or property data within one of the web ontologies 180a-180n and, if so, the RDF statement term is determined to be a problem term. A list of the problematic terms can be referred to as "set C" which is the difference between set B and set A. How each of the problematic terms in "set C" is corrected depends upon which of the prefix data and property data of the term is problematic.

Figure 3:
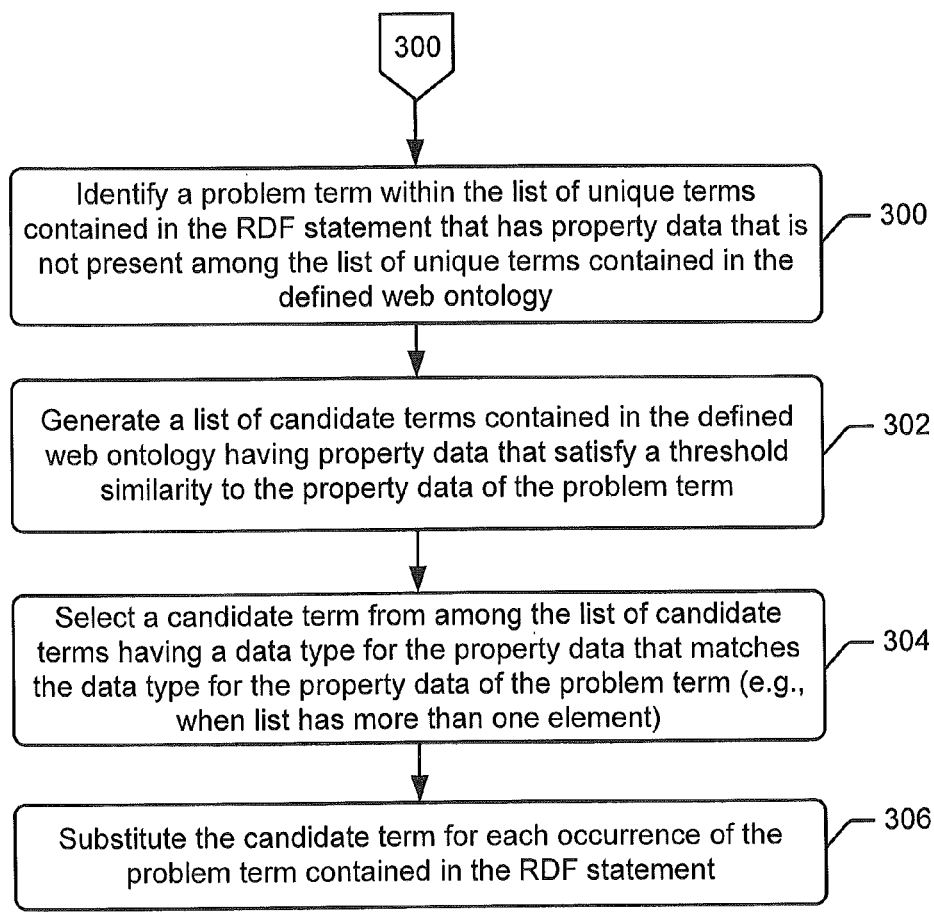

When a determination (Block 206) is made that the prefix data is correct because it matches one of the web ontologies 180a-180n, and the property data is incorrect because it does not match one of the web ontologies 180a-180n for the prefix data, the RDF processing computer 100 can perform operations of FIG. 3 to identify a candidate term for substitution to correct the problematic term. Referring to FIG. 3, a problem term within the list of unique terms contained in RDF statement is identified (Block 300) which has property data that is not present among the list of unique terms contained in the defined ontologies 180a-180n. A list of candidate terms contained in the defined web ontologies 180a-180n that satisfy a threshold similarity to the property data of the problem term is generated (Block 302).

The threshold similarity may be determined based on computing Levenshtein distance values between the problem term and each of the list of candidate terms contained in the defined web ontology language, and including in the list of candidate terms the candidate terms having a computed Levenshtein distance value that satisfies a defined threshold value. The Levenshtein distance values may be computed between the problem term and one of the candidate terms in the list contained in the defined web ontology language, based on the minimum number of single-character edits (e.g., insertions, deletions, or substitutions) needed to change the problem term into the candidate term. The threshold value may be selected based on an accuracy factor that is selected based on an identifier of an author of a web document from which the RDF statement was obtained and/or an identifier of a website (e.g., URI) from which the RDF statement was obtained. The accuracy factor may be defined to adjust the threshold value to reduce the number of candidate terms with an associated loss of accuracy of the corrections for authors and/or websites that are not among a list who's RDF statements are handled with a higher level of accuracy processing.

When the list contains more than one candidate term, a candidate term is selected (Block 304) from among the list of candidate terms having a data type for the property data that matches the data type for the property data of the problem term. Alternatively or additionally, the list of candidate terms can be presented to a user for selection. When presented to a user, the most likely correct candidate term can be indicated to the user relative to the other candidate terms among the list. The selected candidate term is substituted (Block 306) for each occurrence of the problem term contained in the RDF statement.

The RDF processing computer 100 may use learning-based feedback relating to an identified source of the RDF statement, such as an identifier of an author of a web document from which the RDF statement was obtained and/or an identifier of a website (e.g., URI) from which the RDF statement was obtained. For example, prior to the selection (Block 304) of the candidate term from among the list of candidate terms, the RDF processing computer 100 may select a subset of the list of candidate terms that are within a list of historical candidate terms that have been earlier substituted for problem terms identified in other RDF statements. Then, the selection (Block 304) of the candidate term from among the list of candidate terms having the data type for the property data that matches the data type for the property data of the problem term, can include selecting the candidate term from among the subset of the list of candidate terms.

Thus, knowledge of previously observed errors in RDF statements can be used to improve accuracy with which a candidate term is selected from among the list of candidate terms. Accuracy may be further improved by constraining the corrected list of historical candidate terms to those that have been identified for the same author, website, etc. In a further embodiment, the RDF processing computer 100 identifies an author of the RDF statement, and constrains members of the list of historical candidate terms to those that have been have been earlier substituted for problem terms identified in other RDF statements from the same author.

Figure 5:
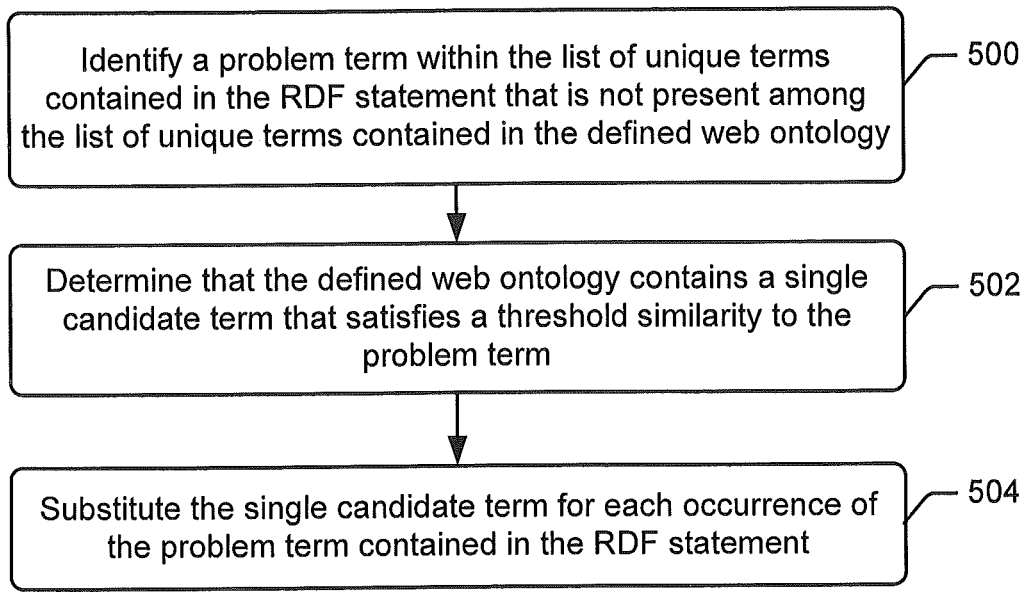

In the embodiment of FIG. 3, it is assumed that the list of candidate terms contained a plurality of terms. FIG. 5 illustrates operations that may be performed by the RDF processing computer 100 when the decision (Block 206) is that the term of the RDF statement contains correct prefix data but incorrect associated property data, and when a single match is found between that problem term and the unique terms in the web ontologies 180a-180n. Referring to FIG. 5, the problem term is identified (Block 500) within the list of unique terms contained in RDF statement is not present among the list of unique terms contained in the web ontologies 180a-180n. The RDF processing computer 100 determines (Block 502) that one of the defined web ontologies 180a-180n contains a single candidate term that satisfies a threshold similarity to the problem term. The single candidate term is then substituted (Block 504) for each occurrence of the problem term contained in RDF statement.

Figure 4:
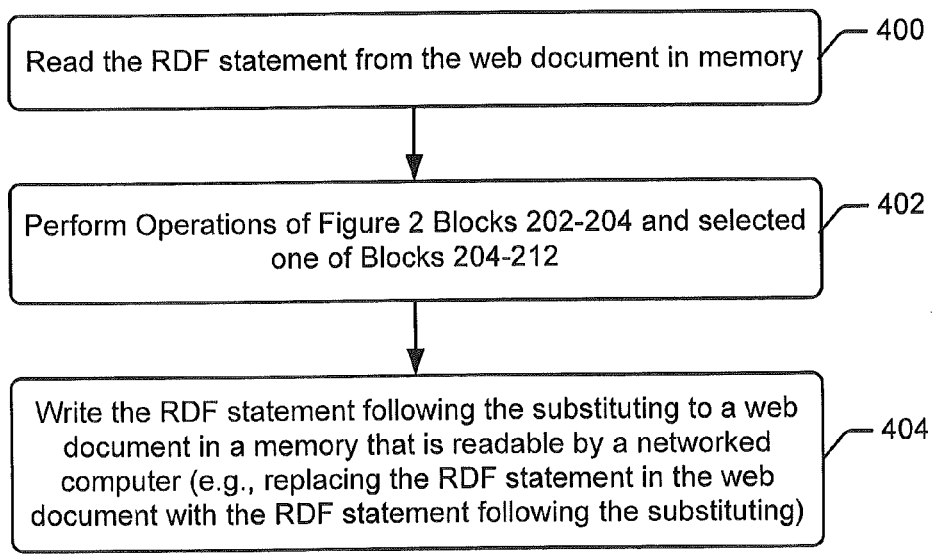

The corrected RDF statement can be written to the web document repository 160. FIG. 4 illustrates operations that can be performed by the RDF processing computer 100. Referring to FIG. 4, the RDF processing computer 100 reads (Block 400) the RDF statement from the web document repository 160. The operations of Blocks 202 and 204 and a selected one of the decision Blocks 206-212 are performed (Block 402). The RDF statement following the substitution (correction of the problem term(s)) is written (Block 404) to the web document repository 160. For example, the RDF statement containing the problem term(s) can be replaced with the RDF statement containing the corrected term(s).

Alternatively or additionally, the corrected RDF statement can be written to the repository of content of web pages 170. The RDF processing computer 100 may operate in parallel with the web page search engine computer 140 to identify and correct problematic terms within RDF statements that the web page search engine computer 140 has received from browsed websites such as the web resources 120. As explained above, problematic terms can be introduced into RDF statements through erroneous coding by a web author, during storage on a website server, and/or during communication to the web page search engine computer 140.

The RDF processing computer 100 may operate to receive from a network computer a request message containing a uniform resource identifier (URI) of a web document, which may reside in a networked web resource 120 or in the web document repository 160. The RDF processing computer 100 can responsively read (Block 202) the RDF statement from the web document, identify (Block 300) a problem term, and perform the substitution (Block 306) of the candidate term for each occurrence of the problem term contained in the RDF statement. The RDF processing computer 100 can then communicate the RDF statement following the substitution to the network computer as part of a response RDF message to the request message.

Figure 6:
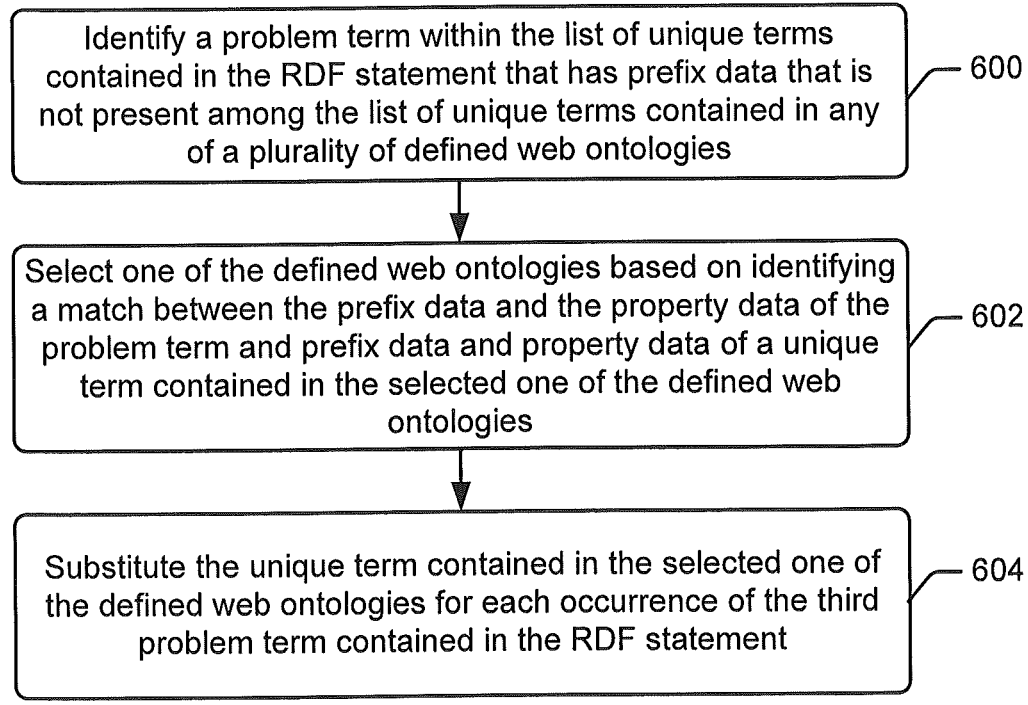

Referring again to FIG. 2, when a determination is made (block 208) for a term of the RDF statement that the prefix data is incorrect and the associated property data is correct, the RDF processing computer 100 can perform operations of FIG. 6 to identify a candidate term for substitution to correct the problematic term. Referring to FIG. 6, a problem term is identified (Block 600) within the list of unique terms contained in the RDF statement that has prefix data that is not present among the list of unique terms contained in any of the web ontologies 180a-180n. One of the web ontologies 180a-180n (e.g., web ontologies 180a) is selected (block 602) based on identifying a match between the prefix data in the property data of the problem term and prefix data and property data of unique term contained in the selected one of the web ontologies 180a-180n (e.g., web ontology 180a). The unique term contained in the selected one of the web ontologies 180a-180n is substituted (Block 604) for each occurrence of the problem term contained in the RDF statement. The entire unique term from the selected one of the web ontologies 180a-180n can be substituted for each occurrence of the problem term contained in the RDF statement, or just the prefix data contained in the unique term unique term from the selected one of the web ontologies 180a-180n can be substituted for the prefix data contained in each occurrence of the problem term contained in the RDF statement.

Referring again to FIG. 2, when a determination is made (block 210) for a term of the RDF statement that the term contains correct property data but is missing prefix data, the RDF processing computer 100 can perform the operations of FIG. 6 to identify a candidate term for substitution to correct the problematic term.

Referring again to FIG. 2, when a determination is made (block 212) for a term of the RDF statement that the term contains incorrect property data and is missing prefix data, the RDF processing computer 100 can perform the operations of FIG. 3 to identify a candidate term for substitution to correct the problematic term. These operations will result in a list of candidate terms, which can be selected among using one or more approaches disclosed herein. For example, the list of candidate terms may be presented to a user for selection. Alternatively or additionally, a selection among the list of candidate terms may be made based on learning-based feedback relating to an identified source of the RDF statement, such as based on substitutions that have historically been made associated with an identifier of an author of a web document from which the RDF statement was obtained and/or an identifier of a website (e.g., URI) from which the RDF statement was obtained. Knowledge of previously observed errors in RDF statements can be used to improve accuracy with which a candidate term is selected from among the list of candidate terms. Accuracy may be further improved by constraining the corrected list of historical candidate terms to those that have been identified for the same author, website, etc. In a further embodiment, the RDF processing computer 100 identifies an author of the RDF statement, and constrains members of the list of historical candidate terms to those that have been have been earlier substituted for problem terms identified in other RDF statements from the same author.

Figure 7:
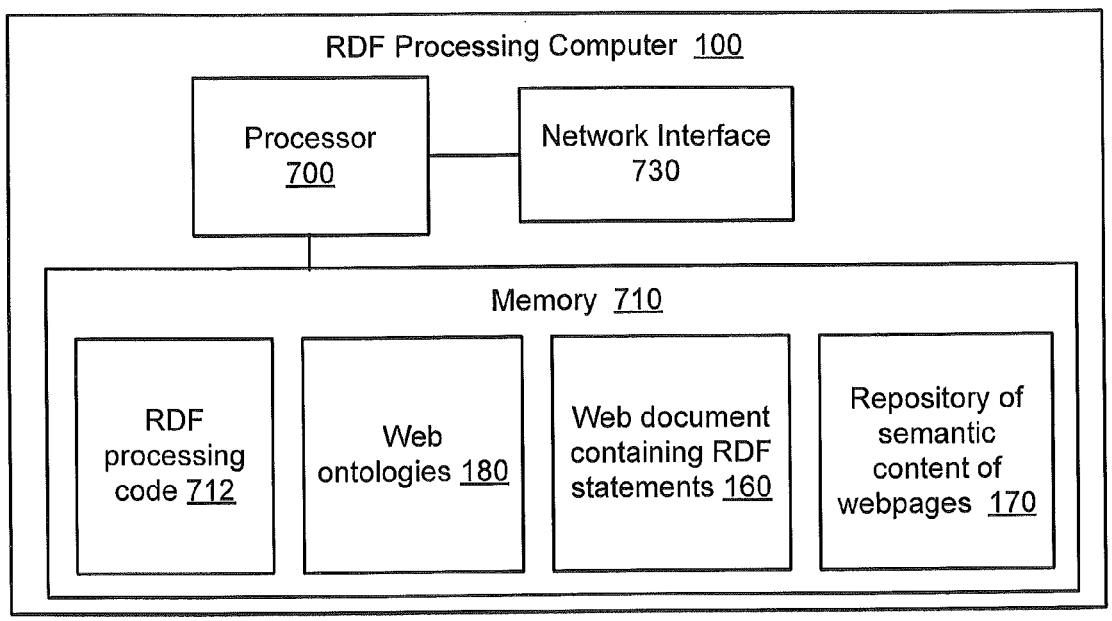
FIG. 7 is a block diagram of the RDF processing computer of FIG. 1 configured according to one embodiment.

FIG. 7 is a block diagram of the RDF processing computer 100 of FIG. 1 configured according to one embodiment. Referring to FIG. 7, a processor 700 may include one or more data processing circuits, such as a general purpose and/or special purpose processor (e.g., microprocessor and/or digital signal processor) that may be collocated or distributed across one or more networks. The processor 700 is configured to execute computer readable program code, such as RDF processing code 712, in a memory 710, described below as a computer readable medium, to perform some or all of the operations and methods disclosed herein for one or more of the embodiments. The memory 710 may include the web ontologies 180, the web document repository 160, and/or the repository semantic content of web pages 170. Although a single memory block 710 has been illustrated for simplicity, it is to be understood that any number, combination of types, and hierarchy of memory storage devices (e.g, solid state memory devices, disk drives, etc.) can be used. A network interface 730 can communicatively connect the processor 700 to the web resources 120, the web document authoring computer 130, the web page search engine computer 140, and one or more of the repositories 150 shown in FIG. 1.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method by a computer comprising:
   generating a list of unique terms, each comprising prefix data and associated property data, contained in a defined web ontology language;
   receiving a resource descriptive framework (RDF) statement about a web resource;

generating a list of unique terms, each comprising prefix data and associated property data, contained in the RDF statement;

identifying a first problem term within the list of unique terms contained in the RDF statement that is not present among the list of unique terms contained in the defined web ontology language, the first problem term comprising an error in the RDF statement;

generating a list of candidate terms contained in the defined web ontology that satisfy a threshold similarity to the first problem term;

selecting a candidate term from among the list of candidate terms having a data type for the property data that matches a data type for the property data of the first problem term; and substituting the candidate term for each occurrence of the first problem term contained in the RDF statement.

2. The method of claim 1, further comprising:

writing the RDF statement following the substituting to a web document in a memory that is readable by a networked computer.

3. The method of claim 2, wherein:

the receiving the RDF statement about the web resource, comprises reading the RDF statement from the web document in memory; and the writing the RDF statement comprises replacing the RDF statement in the web document with the RDF statement following the substituting.

4. The method of claim 1, wherein the method is performed by a computer web page search engine, and further comprising:

writing the RDF statement following the substituting to a repository of semantic content of web pages from a plurality of websites.

5. The method of claim 1, wherein receiving the RDF statement about the web resource, comprises:

receiving from a networked computer a request message containing a uniform resource identifier (URI) of a web document;

reading the RDF statement from the web document in memory; and performing the substituting the candidate term for each occurrence of the first problem term contained in the RDF statement; and further comprising communicating the RDF statement following the substituting to the network computer as part of a response RDF message to the request message.

6. The method of claim 1, further comprising:

prior to the selecting the candidate term from among the list of candidate terms, selecting a subset of the list of candidate terms that are within a list of historical candidate terms that have been earlier substituted for problem terms identified in other RDF statements, wherein the selecting the candidate term from among the list of candidate terms having the data type for the property data that matches the data type for the property data of the first problem term, comprises selecting the candidate term from among the subset of the list of candidate terms.

7. The method of claim 6, further comprising:

identifying an author of the RDF statement; and constraining members of the list of historical candidate terms to those that have been earlier substituted for problem terms identified in other RDF statements from the same author.

8. The method of claim 1, wherein the generating a list of candidate terms contained in the defined web ontology that satisfy the threshold similarity to the first problem term, comprises:

computing Levenshtein distance values between the first problem term and each of the list of candidate terms contained in the defined web ontology; and including in the list of candidate terms the candidate terms having a computed Levenshtein distance value that satisfies a defined threshold value.

9. The method of claim 1, further comprising:

identifying a second problem term within the list of unique terms contained in the RDF statement that is not present among the list of unique terms contained in the defined web ontology, the second problem term comprising an error in the RDF statement;

determining that the defined web ontology contains a single candidate term that satisfies a threshold similarity to the second problem term; and substituting the single candidate term for each occurrence of the second problem term contained in the RDF statement.

10. The method of claim 1, further comprising:

identifying a third problem term within the list of unique terms contained in the RDF statement that is not present among the list of unique terms contained in any of a plurality of defined web ontologies, the third problem term comprising an error in the RDF statement;

selecting one of the defined web ontologies based on identifying a match between the prefix data and the property data of the third problem term and prefix data and property data of a unique term contained in the selected one of the defined web ontologies;

substituting the unique term contained in the selected one of the defined web ontologies for each occurrence of the third problem term contained in the RDF statement.

11. A computer program product comprising:

a computer readable non-transitory storage medium having computer readable program code embodied in the non-transitory storage medium that when executed by a processor of a computer system causes the computer system to perform operations comprising:

generating a list of unique terms, each comprising prefix data and associated property data, contained in a defined web ontology language;

receiving a resource descriptive framework (RDF) statement about a web resource;

generating a list of unique terms, each comprising prefix data and associated property data, contained in the RDF statement;

identifying a first problem term within the list of unique terms contained in the RDF statement that is not present among the list of unique terms contained in the defined web ontology language, the first problem term comprising an error in the RDF statement;

generating a list of candidate terms contained in the defined web ontology that satisfy a threshold similarity to the first problem term;

selecting a candidate term from among the list of candidate terms having a data type for the property data that matches a data type for the property data of the first problem term; and substituting the candidate term for each occurrence of the first problem term contained in the RDF statement.

12. The computer program product of claim 11, wherein the operations further comprise:
    writing the RDF statement following the substituting to a web document in a memory that is readable by a networked computer.
13. The computer program product of claim 12, wherein:
    the receiving the RDF statement about the web resource, comprises reading the RDF statement from the web document in memory; and
    the writing the RDF statement comprises replacing the RDF statement in the web document with the RDF statement following the substituting.
14. The computer program product of claim 11, wherein the operations further comprise:
    writing the RDF statement following the substituting to a repository of semantic content of web pages from a plurality of websites.
15. The computer program product of claim 11, wherein receiving the RDF statement about the web resource, comprises:
    receiving from a networked computer a request message containing a uniform resource identifier (URI) of a web document;
    reading the RDF statement from the web document in memory; and
    performing the substituting the candidate term for each occurrence of the first problem term contained in the RDF statement; and
    the operations further comprise communicating the RDF statement following the substituting to the network computer as part of a response RDF message to the request message.
16. The computer program product of claim 11, wherein the operations further comprise:
    prior to the selecting the candidate term from among the list of candidate terms, selecting a subset of the list of candidate terms that are within a list of historical candidate terms that have been earlier substituted for problem terms identified in other RDF statements,
    wherein the selecting the candidate term from among the list of candidate terms having the data type for the property data that matches the data type for the property data of the first problem term, comprises selecting the candidate term from among the subset of the list of candidate terms.
17. The computer program product of claim 16, wherein the operations further comprise:
    identifying an author of the RDF statement; and
    constraining members of the list of historical candidate terms to those that have been earlier substituted for problem terms identified in other RDF statements from the same author.
18. The computer program product of claim 11, wherein the generating a list of candidate terms contained in the defined web ontology that satisfy the threshold similarity to the first problem term, comprises:
    computing Levenshtein distance values between the first problem term and each of the list of candidate terms contained in the defined web ontology language; and
    including in the list of candidate terms the candidate terms having a computed Levenshtein distance value that satisfies a defined threshold value.
19. The computer program product of claim 11, wherein the operations further comprise:
    identifying a second problem term within the list of unique terms contained in the RDF statement that is not present among the list of unique terms contained in the defined web ontology language, the second problem term comprising an error in the RDF statement;
    determining that the defined web ontology contains a single candidate term that satisfies a threshold similarity to the second problem term; and
    substituting the single candidate term for each occurrence of the second problem term contained in the RDF statement.
20. The computer program product of claim 11, wherein the operations further comprise:
    identifying a third problem term within the list of unique terms contained in the RDF statement that is not present among the list of unique terms contained in any of a plurality of defined web ontologies, the third problem term comprising an error in the RDF statement;
    selecting one of the defined web ontologies based on identifying a match between the prefix data and the property data of the third problem term and prefix data and property data of a unique term contained in the selected one of the defined web ontologies;
    substituting the unique term contained in the selected one of the defined web ontologies for each occurrence of the property data of the third problem term contained in the RDF statement.

* * * * *